March 15, 1955     I. FLORMAN     2,704,153
RECEPTACLE FOR DISPENSING COSMETICS AND THE LIKE
Filed Aug. 26, 1952
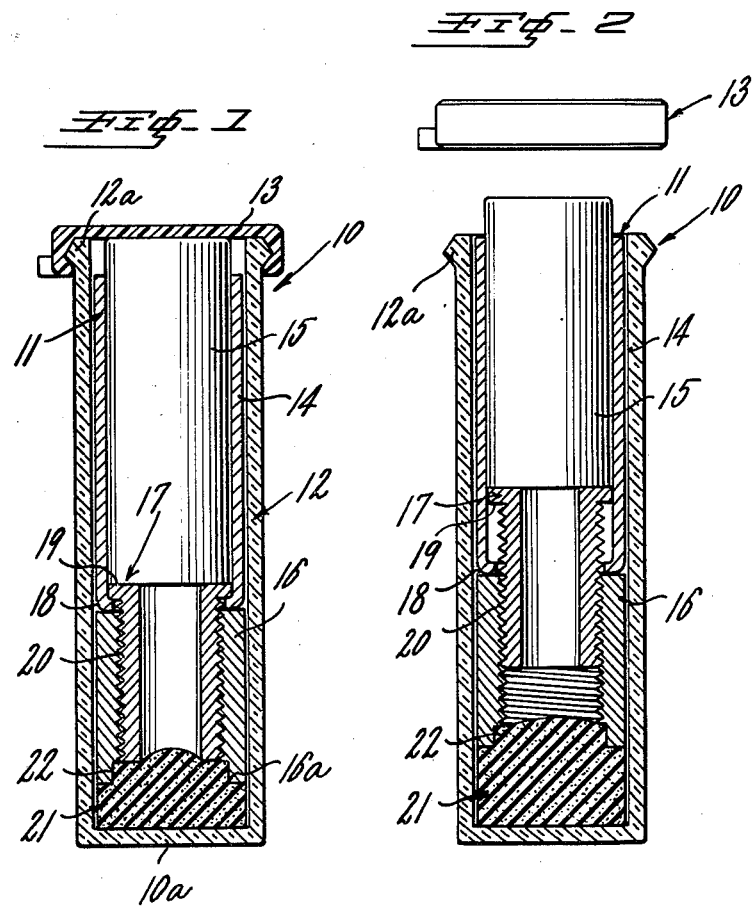
INVENTOR.
IRVING FLORMAN
BY

United States Patent Office 2,704,153
Patented Mar. 15, 1955

2,704,153

RECEPTACLE FOR DISPENSING COSMETICS AND THE LIKE

Irving Florman, New York, N. Y.

Application August 26, 1952, Serial No. 306,369

2 Claims. (Cl. 206—56)

The invention relates to receptacle structures and, more particularly, to receptacles enclosing containers for receiving and dispensing medicaments, pharmaceuticals, cosmetics or the like placed in said containers.

It is one of the objects of the present invention to provide means causing the contents of a container to automatically extend out of the receptacle and enable the user to readily and easily remove part of the contents.

It is a further object of the invention to provide means for adjustably supporting the contents in a container within an outer receptacle.

It is another object of the present invention to provide means affording adjustment of the height of the contents within or relative to the receptacle and container.

Yet another object of the present invention is to provide means contributing to the relief of excessive pressures to which adjustable portions of a container are subjected.

The above and other objects of the invention will become further apparent from the following detailed description, reference being had to the accompanying drawing in which:

Fig. 1 is a longitudinal sectional view of a receptacle and container in one position, and constructed in accordance with the invention; and Fig. 2 is a longitudinal sectional view of a receptacle and container in another position.

Referring more particularly to the drawings, Fig. 1 shows a dispenser or receptacle structure composed of an outer receptacle or container 10 and an inner receptacle or container 11. The outer receptacle 10 may be made of transparent or translucent plastic material or glass or opaque material, such as wood or the like. The outer receptacle comprises a hollow body portion 12 and a closure member 13 which may be hinged, threaded or snapped on the top 12a of said body portion. The inner receptacle or container 11 may be made of cardboard, paper-like, or any light-weight sheet material. The container 11 includes an upper tubular element 14 for receiving the article 15, a lower tubular element 16 suitably connected therewith, and an intermediate or innermost tubular member 17. Both the upper and the innermost tubular elements 14, 17 are provided with cooperating flange means 18 and 19, respectively. Flange 18 extends inwardly from upper tubular element 14 and flange 19 outwardly from intermediate tubular element 17. Both said flanges 18, 19 are circular or ring-shaped. In some instances it may be preferable to provide lugs instead of continuous flanges to bring about the function of a bayonet joint between these flange means 18, 19.

Flange means 19 fits within said tubular member 14, and it is slidably and frictionally engaged therein.

Both the intermediate and the lower tubular elements 17, 16 are threadedly engaged at 20. An impervious resilient member 21 is positioned between the bottom wall 10a of receptacle 10 and the bottom portion 16a of lower tubular element 16 within a recess 22 provided in said bottom 16a of said tubular element and within the central passage thereof.

The resilient member 21 may consist of foam or sponge rubber material which is adapted to absorb moisture present within receptacles 10 and 11. Said member may be integral or it may be made from several discs of said material. One of the discs may be engaged within recess 22, and the other discs may be spaced between the bottom 16a of said tubular element and the bottom wall 10a of the receptacle. The number and thickness of said discs may be varied so that the inner container 11 will protrude a predetermined amount above the opening in hollow body 12.

Therefore, resilient member 21 performs three functions. First, it urges the inner container 11 out of the receptacle 10; second, it absorbs excessive pressures exerted on the threaded portion 20 when closure 13 is engaged on the top of receptacle 10, thereby preventing the stripping or wearing out of these threads; and, third, it absorbs moisture present within the receptacle structure.

The tubular elements 14, 16 and 17 may all be made of the same material or they may each be made from a different grade of paper-like substance, cardboard, or light-weight paper or cellulose material.

In assembling the receptacle structure, the intermediate or innermost tubular element 17 is inserted within upper tubular element 14 and threaded within lower tubular element 16. The article 15 is then inserted within upper tubular element 14 for abutment with flange 19 of the innermost element 17. Resilient member 21 is then mounted within recess 22, and the entire inner container 11 so formed is then introduced into the receptacle 10, and the closure 13 is snapped on the suitably shaped end 12a of body portion 12.

In operation, whenever the closure member 13 is removed, the article 15 springs or projects out to the position shown in Fig. 2 to a predetermined distance. When the article is so used up that it no longer protrudes from either receptacle 10 or container 11, the operator grasps the lower tubular element 16 and rotates it in relation to the upper tubular element 14. Since the intermediate tubular element is frictionally held within upper tubular element 14, the threaded engagement thereof with said tubular element 16 causes a lifting motion thereof, and by the engagement of flange 19 with the article 15 causes the latter to move upwardly and to be somewhat moved out of the receptacle or container 11.

Although only one specific embodiment of the invention has been described and shown in the drawing, it should be noted that the invention may be realized in modified form and adaptations of the arrangements herein disclosed may be made as may readily occur to persons skilled in the art within constituting a departure from the spirit and scope of the invention as defined in the objects and in the appended claims.

Having thus described the receptacle structure constructed in accordance with the invention, I claim:

1. A receptacle structure for dispensing a cosmetic and like article, comprising an outer tubular container having a bottom and an open end, two inner tubular elements successively arranged to each other and forming upper and lower tubular elements slidable within said outer tubular container, and an innermost tubular element terminating in a flange at its upper end, said flange being slidable within and in frictional contact with said upper tubular element and adapted to support said article, said innermost tubular element being provided with outer threads extending from said flange to the other end of said innermost tubular element, said lower tubular element being provided with inner threads engaging said outer threads of said innermost tubular element, said lower tubular element terminating in a recess, and resilient, moisture-absorbent means extending from said bottom of said outer tubular container into said recess and adapted to displace said inner tubular elements together with said innermost tubular element relative to said outer tubular container, said innermost tubular element being threadedly displaceable with respect to said inner tubular elements, respectively, and relative to said resilient means, which automatically centers with respect to said innermost tubular element.

2. A receptacle structure according to claim 1, wherein said upper tubular element is provided with an inturned flange, which extends below said flange of said innermost tubular element.

(References on following page)

References Cited in the file of this patent

UNITED STATES PATENTS

| | | |
|---|---|---|
| 955,617 | Tucker | Apr. 19, 1910 |
| 2,000,487 | Koch | May 7, 1935 |
| 2,559,906 | Tursky | July 10, 1951 |
| 2,565,346 | Braselton | Aug. 21, 1951 |
| 2,610,734 | Noyack | Sept. 16, 1952 |

FOREIGN PATENTS

| | | |
|---|---|---|
| 598,838 | Great Britain | Feb. 27, 1948 |